(12) United States Patent
Rossato et al.

(10) Patent No.: US 9,129,411 B2
(45) Date of Patent: Sep. 8, 2015

(54) UPSAMPLING IN A TIERED SIGNAL QUALITY HIERARCHY

(76) Inventors: Luca Rossato, Milan (IT); Guido Meardi, Milan (IT)

( * ) Notice: Subject to any disclaimer, the term of this patent is extended or adjusted under 35 U.S.C. 154(b) by 822 days.

(21) Appl. No.: 13/188,220

(22) Filed: Jul. 21, 2011

(65) Prior Publication Data

US 2013/0294544 A1 Nov. 7, 2013

(51) Int. Cl.
*G06T 3/40* (2006.01)
*H04N 19/176* (2014.01)
*H04N 19/61* (2014.01)
*H04N 19/117* (2014.01)
*H04N 19/14* (2014.01)
*H04N 19/182* (2014.01)
*H04N 19/33* (2014.01)
*H04N 19/59* (2014.01)

(52) U.S. Cl.
CPC .............. *G06T 3/403* (2013.01); *H04N 19/117* (2014.11); *H04N 19/14* (2014.11); *H04N 19/176* (2014.11); *H04N 19/182* (2014.11); *H04N 19/33* (2014.11); *H04N 19/59* (2014.11); *H04N 19/61* (2014.11)

(58) Field of Classification Search
USPC ........................ 348/143, 607; 375/240–240.2
See application file for complete search history.

(56) References Cited

U.S. PATENT DOCUMENTS

| 6,229,578 B1 * | 5/2001 | Acharya et al. ............... 348/607 |
| 2010/0013920 A1 * | 1/2010 | Nikulin et al. ................ 348/143 |
| 2012/0051432 A1 * | 3/2012 | Fernandes et al. ....... 375/240.16 |

OTHER PUBLICATIONS

Hui Li et al: "A fast content-dependent interpolation approach via adaptive filtering", Multimedia Signal Processing, 2008 IEEE 10th Workshop on, IEEE, Piscataway, NJ, USA, Oct. 8, 2008, pp. 530-534.*
Li, Hui et al., "A Fast Content-Dependent Interpolation Approach Via Adaptive Filtering", 2008, Total pp. 5, IEEE 2008.
Beerman, Markus, "Non-linear Up-sampling for Spatial Scalability", Jul. 17-21, 2006, Total pp. 7, RWTH Aachen University, Germany.
Tsai, An-Chao et al., "Classified Multifilter Up-Sampling Algorithm in Spatial Scalability for H.264/SVC Encoder", IEEE Transactions on Circuits and Systems for Video Technology, Jun. 2010, Total pp. 10, vol. 20 No. 6, IEEE, New York.
International Search Report from corresponding PCT application No. PCT/IB2012/053724, mailed Nov. 22, 2012, Total pp. 3.

* cited by examiner

*Primary Examiner* — Dave Czekaj
*Assistant Examiner* — Shanika Brumfield
(74) *Attorney, Agent, or Firm* — Chapin IP Law, LLC

(57) ABSTRACT

A signal processor selects an element from a rendition of a signal at a first level of quality to upsample into multiple elements of a rendition of the signal at a second (higher) level of quality. The signal processor produces a metric based on settings of elements in a vicinity of the selected element in the rendition of the signal at the first level of quality. The metric defines a boundary between a first set of elements in a vicinity of the selected element and a second set of elements in a vicinity of the selected element. The signal processor utilizes the metric to calculate settings for the multiple elements in the signal at the second level of quality. A location and orientation of the boundary with respect to the selected element depends on the settings of elements in the vicinity of the selected element.

24 Claims, 12 Drawing Sheets

M = ELEMENT IN WHICH DERIVED METRIC IS USED FOR UPSAMPLING THE IMAGE TO NEXT LEVEL OF QUALITY

O = ELEMENT IN WHICH AN ALTERNATIVE OPERATION (E.G., NOT USING METRIC) IS USED FOR UPSAMPLING THE IMAGE TO NEXT LEVEL OF QUALITY

MAP 510

LOQ #1 ⟶ LOQ #2

FIG. 5

UPSAMPLING IN A TIERED SIGNAL QUALITY HIERARCHY

RELATED APPLICATIONS

This application is related to U.S. patent application Ser. No. 13/188,188 entitled "INHERITANCE IN A TIERED SIGNAL QUALITY HIERARCHY," filed on the same day as the present application, the entire teachings of which are incorporated herein by this reference.

This application is related to U.S. patent application Ser. No. 13/188,201 entitled "TIERED SIGNAL DECODING AND SIGNAL RECONSTRUCTION," filed on the same day as the present application, the entire teachings of which are incorporated herein by this reference.

This application is related to U.S. patent application Ser. No. 13/188,207 entitled "SIGNAL PROCESSING AND TIERED SIGNAL ENCODING," filed on the same day as the present application, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY," filed on the same day as the present application, the entire teachings of which are incorporated herein by this reference.

This application is related to U.S. patent application Ser. No. 13/188,237 entitled "TRANSMISSION OF RECONSTRUCTION DATA IN A TIERED SIGNAL QUALITY HIERARCHY," filed on the same day as the present application, the entire teachings of which are incorporated herein by this reference.

BACKGROUND

CPU (Central Processing Unit) efficiency matters both during encoding and decoding of a signal. Latest generation processors are becoming more and more parallel, with up to hundreds of simple cores on each single chip.

Unfortunately, by nature, traditional MPEG (Moving Pictures Expert Group) family codecs are structurally non-parallel. That stems from the fact that they are block-based, and each image block must be encoded and decoded sequentially, since to achieve efficient compression all blocks must be made to depend in some way on each other.

Via the introduction of so-called "slices" (basically, pieces of the image that are treated independently of one another, as if they were separate videos put one next to the other) into MPEG coding, the H.264 standard allows for processing of a few threads in parallel (typically 2 or 3 threads). Important algorithm elements such as de-blocking (i.e., a filter that "smoothes" the transitions among blocks to create a more uniform image) are typically global operations full of conditional instructions, which are unsuitable for applications including parallel CPUs.

Today's CPUs and GPUs (Graphics Processing Units) are typically very powerful; a single GPU can include several hundreds of computing cores to perform parallel processing of information. When using current technology, larger portions of an image can be stored in a processor cache for processing. The need to fragment images into a multitude of small blocks, which was a driving factor when MPEG was created, as processors from that era could only deal with very small chunks of video data at a time—and then only sequentially—no longer applies to modern CPUs and GPUs. Thus, a large portion of available processing power may go unused when implementing MPEG-like types of encoding/decoding, with blocking artifacts needlessly introduced into the signal.

Also, compared to what was current when MPEG was developed, modern day applications typically require much higher definition video encoding and much higher overall playback quality. In high-definition (HD), high-quality videos, there is a much larger difference between areas with low detail (potentially even out of focus) and areas with very fine detail. This makes the use of frequency-domain transforms such as those used in MPEG even more unsuitable for image processing and playback, since the range of relevant frequencies is getting much broader.

In addition, higher resolution images include a higher amount of camera noise and/or film grain, i.e., very detailed high-frequency pixel transitions that can be quite irrelevant for viewing and require many bits to encode.

Lastly, traditional codecs are ill-suited to perform efficiently with 3D or volumetric imaging, which is becoming more and more important in fields such as medical imaging, scientific imaging, etc.

Most target devices today support different playback resolutions and quality. So-called SVC (Scalable Video Coding), the current MPEG standard for scalability, has not been received favorably by the industry and shows little to non-existent adoption, because it is considered way too complex and somewhat bandwidth inefficient.

Moreover, encoded videos are plentiful; that is, a content provider typically doesn't have the time to customize encoder parameters and experiment with each specific video stream. Currently, content providers dislike that many encoding parameters must be manually tweaked (every time performing an encoding and checking the quality of results) in order to successfully encode a video.

As an alternative to MPEG standards for encoding/decoding, so-called image pyramids have been used for encoding/decoding purposes. For example, using Laplacian pyramids, conventional systems have created lower resolution images using Gaussian filters and then building the pyramid of the differences between the images obtained by upsampling with a rigidly programmed decoder back from the lower resolution levels to the original level.

Use of conventional Laplacian pyramid encoding has been abandoned. One deficiency of such transforms is that the authors were always trying to avoid distortions/artifacts in the downsampled image, so they typically used Gaussian filtering, as it is the only type of filter that doesn't add any information of its own. However, the insurmountable problem with Gaussian filtering is that it introduces a blurring effect, such that when upscaling back to higher resolutions, there is a need for an inordinate amount of image correction information to reproduce the original image. In other words, upsampling with conventional filters results in jagged or blurry edges in a reconstructed image. The jagged or blurry edges need to be corrected using a substantial amount of residual data, making such an encoding technique undesirable for use in higher resolution applications.

BRIEF DESCRIPTION

Embodiments herein deviate with respect to conventional systems and methods to reduce an amount of residual data needed to reconstruct a signal with sufficient accuracy when upsampling from a lower resolution rendition of the signal. For example, embodiments herein are directed to unique ways of utilizing one or more different upsample operations to sharpen and "deblend" an identified transition region during upsampling. Certain configurations of the proposed upsampling technique reduce an amount of data that is needed to reconstruct a signal when decoding the signal at successively higher levels of quality in a hierarchy because the upsampling operation enables more accurate reconstruction of higher levels of quality.

More specifically, one embodiment herein includes a signal processor configured to reconstruct a signal at higher levels of quality in a hierarchy. For example, the signal processor selects an element from a rendition of the signal at a first level of quality to upsample into multiple elements of a rendition of the signal at a second (higher) level of quality. In one embodiment, the signal processor produces for each element of the signal a metric based on settings of elements in a vicinity of the selected element in the rendition of the signal at the first level of quality. The metric defines a boundary between a first set of elements in a vicinity of the selected element and a second set of elements in a vicinity of the selected element. A location and orientation of the boundary with respect to the selected element depends on the settings of elements in the vicinity of the selected element. The signal processor utilizes the generated metric (which defines the boundary) to calculate settings for the multiple elements in the signal at the second level of quality. Accordingly, settings of elements in a vicinity of the selected element indicate how to upsample the selected element into the multiple elements.

Depending on the embodiment, the boundary defined by the metric can be a line, planar surface, etc. The signal being upsampled can be a two-dimensional image, three-dimensional volumetric image, etc. The settings assigned to specific signal elements can represent colors of different color planes (e.g., RGB, YUV, HSV, etc.), attributes (e.g., density, radioactivity, tissue type, terrain type, temperature, parameters defining image properties, etc.), motion vectors (e.g., expressed in Cartesian coordinates, polar coordinates, etc.), etc.

In one embodiment, the signal processor produces the metric in response to detecting that a setting of the selected element falls within a range defined by elements in a vicinity of the selected element to be upsampled. Falling within the range indicates that the selected element falls on a transition region or edge. In accordance with such an embodiment, and to test whether the selected element falls on a transition region, the signal processor generates a first value based on settings of at least one element in the first set of elements in the vicinity of the selected element. The signal processor generates a second value based on settings of at least two elements in the second set of elements in the vicinity of the selected element. The signal processor then produces a range in which the larger of the two values defines an upper limit of the range and the other value defines a lower limit of the range. As mentioned above, if a setting of the selected element falls within the range, the signal processor assumes that the selected element resides on a transition region or edge.

In accordance with further embodiments, the signal processor utilizes the metric as a basis for upsampling the selected element into the multiple elements. For example, the signal processor identifies a first element in the multiple elements (i.e., the upsampled elements at a next higher level of quality) in which the boundary defined by the metric intersects the first element. For the first element, the signal processor utilizes the metric to calculate a setting for the first element. The signal processor sets a value of the first element between a setting assigned to the first set of elements and a setting assigned to the second set of elements.

Additionally, the signal processor identifies a second element of the multiple elements in which the boundary defined by the metric does not intersect the second element. For the second element: in response to detecting that all of the second element resides between the boundary defined by the metric and the first set of elements (e.g., elements defining the range limit), the signal processor sets the second element to a value substantially equal to the setting assigned to the first set of elements.

In a similar way, the signal processor identifies the remaining elements in the multiple elements (i.e., the upsampled elements at the next higher level of quality), utilizing the metric to calculate settings for each element.

In yet further embodiments, the signal processor applies a test to each of multiple respective elements in the rendition of the signal at the first level of quality to determine whether to use a respective metric to upsample an element or use an alternative upsample option to upsample the element. For example, the signal processor can be configured to assign a first type of upsample operation to the respective element (e.g., one that uses a metric as discussed herein) or assign a second type of upsample operation (e.g., one that does not use a generated metric) to the respective element. As mentioned above, the test of determining whether to use a generated metric or alternative upsample operation to upsample can include determining whether a setting of a selected respective element falls within a range defined by settings of a respective first set of elements in a vicinity of the selected respective element and settings of a respective second set of elements in a vicinity of the selected respective element.

In one embodiment, the signal processor assigns the first type of upsample operation for upsampling the respective elements in which a respective setting of the selected element under test falls within the range produced for the respective element. The signal processor assigns the second type of upsample operation for upsampling the respective elements in which a respective setting of the selected element under test falls outside the range produced for the respective element.

These and other embodiment variations are discussed in more detail below.

As mentioned above, note that embodiments herein can include a configuration of one or more computerized devices, routers, network, workstations, handheld or laptop computers, or the like to carry out and/or support any or all of the method operations disclosed herein. In other words, one or more computerized devices or processors can be programmed and/or configured to operate as explained herein to carry out different embodiments.

In addition to the upsampling as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: select an element from a rendition of the signal at a first level of quality to upsample into multiple elements of a rendition of the signal at a second, higher level of quality; produce a metric based on settings of elements in a vicinity of the selected element in the rendition of the signal at the first level of quality, the metric defining a boundary between a first set of elements in a vicinity of the selected element and a second set of elements in a vicinity of the selected element; and utilize the metric to calculate settings for the multiple elements in the signal at the second level of quality.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that encode signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 5 is an example diagram illustrating assignment and use of different types of upsample operations to upsample a rendition of a signal to a higher level of quality according to embodiments herein.

DETAILED DESCRIPTION

Figure 1:
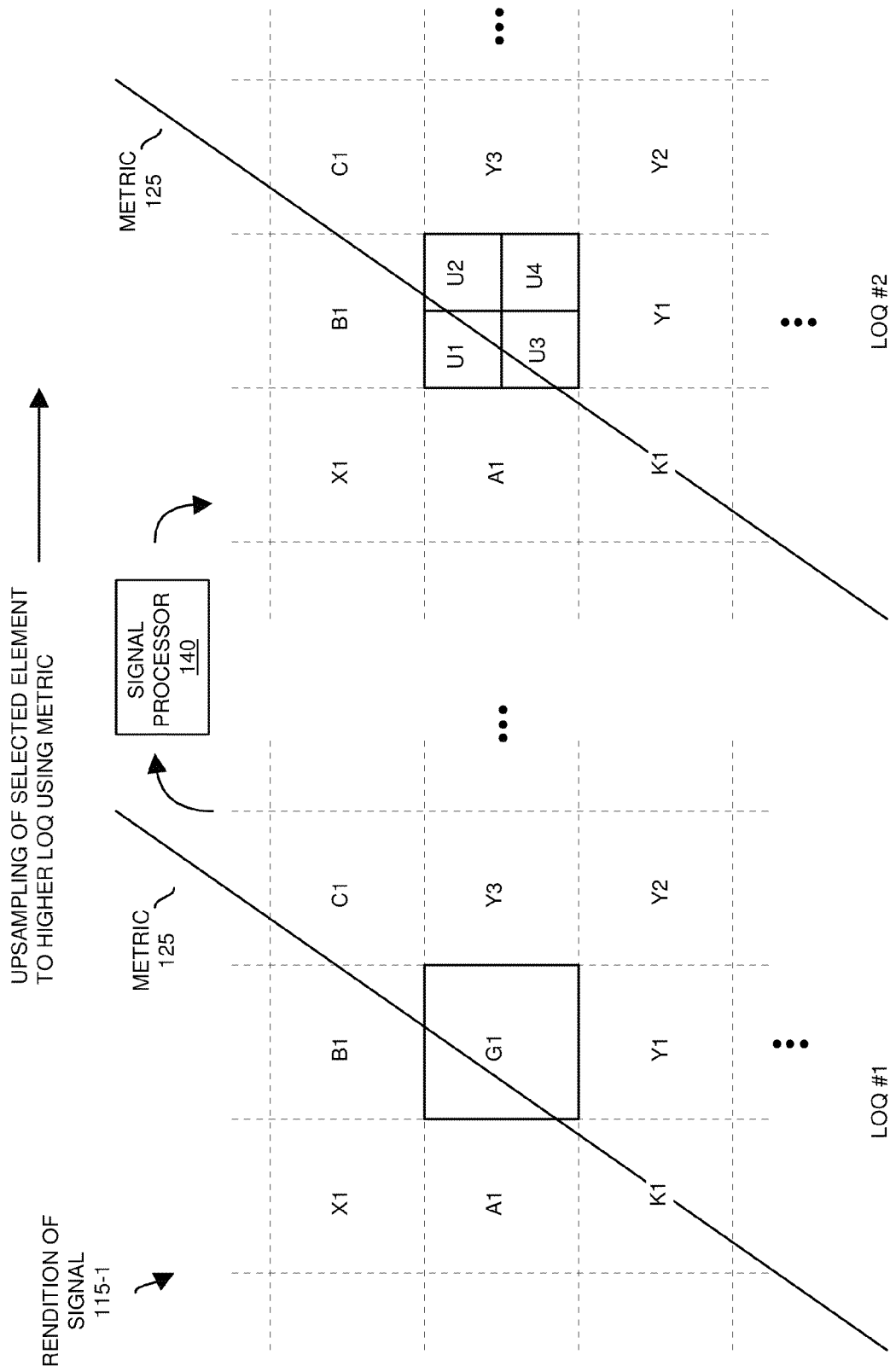
FIG. 1 is an example diagram illustrating upsampling of a selected element into multiple elements using a metric according to embodiments herein.

FIG. 1 is an example diagram illustrating upsampling of a selected element into multiple elements using a metric according to embodiments herein.

As shown, rendition of signal 115-1 at level of quality #1 includes multiple elements including elements X1, B1, C1, A1, G1, Y3, K1, Y1, Y2, etc. Each of the elements in the rendition of signal 115-1 is assigned a value indicating a setting for the respective element.

In this example, rendition of signal 115-1 represents a lower level quality rendition of an original signal. Signal processor 140 upsamples a selected element such as G1 at level of quality #1 into multiple elements such as elements U1, U2, U3, and U4 in the rendition of signal at level of quality #2 (e.g., a higher level of quality). Each of the elements in the rendition of signal 115-1 can be upsampled into a respective set of multiple elements.

In one embodiment, the rendition of signal 115-1 is akin to a thumbnail representation of an original signal that has been downsampled to a lower level of quality. The rendition of signal 115-1 at the lower level of quality captures coarse attributes of the original signal, but not the more detailed finer attributes of the original signal. The detailed, finer attributes appear in the rendition of signal at higher levels of quality.

Note that values associated with the rendition of signal 115-1 can represent any suitable type of data information. By way of a non-limiting example, the signal 115 can be image data, symbols, etc., indicating settings of each of multiple signal elements (e.g., pels/plane elements, pixels/picture elements, voxels/volumetric picture elements, etc.) in a respective image. The image can be two dimensional (e.g., pictures, video frames, 2D motion maps, etc.), three-dimensional (e.g., 3D/volumetric images, holographic images, CAT-scans, medical/scientific images, 3D motion maps, etc.), or even feature more than three dimensions. In accordance with such an embodiment, the settings of the signal elements indicate how to reconstruct the original signal for playback on a device.

Each element in the signal can define a setting such as color. In accordance with such an embodiment, color component of an element in the signal data is encoded in accordance with a suitable color space standard such as YUV, RGB, HSV, etc.

In further embodiments, a combination of settings associated with X1, B1, C1, A1, G1, Y3, K1, Y1, Y2, etc. defines a portion of an image (e.g., a multiple-dimensional image) at the first level of quality. The signal processor 140 is configured to upsample the rendition of signal 115-1 at level of quality #1 (e.g., a lower level of quality) into a respective rendition of the signal at level of quality #2 (e.g., higher level of quality).

Assume in this example that the signal processor 140 selects element G1 for upsampling into multiple elements at a higher level of quality. As mentioned, in accordance with such an embodiment, the signal processor 140 upsamples the selected element G1 in the rendition of signal 115-1 into multiple elements U1, U2, U3, and U4 at a second level of quality. As will be discussed below, if suitable, upsampling can be achieved using a generated metric 125. The signal processor 140 can be configured to upsample the selected element using an alternative upsampling option if use of a metric 125 is deemed not to be suitable for upsampling the selected element.

As shown, to facilitate upsampling to a next higher level of quality (e.g., a higher resolution image), one embodiment herein includes generating metric 125 for the selected element G1 into multiple elements U1, U2, U3, and U4. Depending on the embodiment and the dimensionality of the signal, the metric 125 can be a line, surface, etc., defining a boundary between image elements in a vicinity of a selected element under test.

When the rendition of signal 115-1 is a two-dimensional image, the boundary defined by the metric 125 is substantially a line overlaid on the portion of the signal. As will be discussed further herein, the signal processor 140 uses the line (e.g., boundary) as a basis to calculate the settings (e.g., magnitudes) for multiple image elements such as elements U1, U2, U3, and U4 in the rendition of signal at a next higher level of quality.

As mentioned above, generation and use of the metric 125 to upsample the selected element can be conditional. For example, the method of generating and using metric 125 as discussed herein can be used in circumstances in which is known with reasonable certainty that the selected element being upsampled resides at or near a transition region within the rendition of signal being upsampled.

Settings of the selected element and/or elements residing in a vicinity of the selected element under test can provide an indication of whether the respective element resides on or near a boundary region. That is, if the settings of elements in a nearby vicinity of selected element under test indicate that the selected element resides on or near a transition region, then the signal processor 140 uses a generated metric 125 to calculate settings of the upsampled rendition of the signal. The signal processor 140 may use an alternative upsampling technique (e.g., other than use of a generated metric 125) to upsample from one level of quality to the next if the settings of nearby elements indicate that the selected element to be upsampled does not reside or near a transition region.

The test for determining whether a metric 125 can be generated and used to advantageously upsample the selected element into multiple elements at a next higher level of quality can be based on a magnitude of settings associated with the selected element with respect to magnitudes of settings associated with other elements in a vicinity of the selected element.

According to one embodiment, the signal processor 140 produces a respective metric 125 in response to detecting that a selected element under test has a setting within a range. A lower limit of the range can be defined by settings of a first set of elements in a vicinity of the selected element. An upper limit of the range can be defined by settings of a second set of elements in a vicinity of the selected element.

Thus, in general, the signal processor 140 can be configured to generate and use the metric 125 to upsample the selected element if the setting associated with the selected element falls within a range defined by settings of other elements in a vicinity of the selected element.

In accordance with one embodiment, to produce the range for testing and identifying an edge, the signal processor 140 initially analyzes settings of the elements in a vicinity of a selected element to identify at least a first set of elements and a second set of elements. The first set of elements and second set of elements in a vicinity of the selected element can be disposed opposite, diagonal, etc., each other with respect to the selected element disposed in between the first set and the second set. Each of the sets can include one or more elements.

The signal processor 140 generates a first value based on settings of at least one element in the first set of elements in the vicinity of the selected element. The signal processor 140 generates a second value based on settings of at least two elements in the second set of elements in the vicinity of the selected element. The signal processor 140 produces a range in which the larger of the two values defines an upper limit of the range and the other value defines a lower limit of the range. If the setting of the selected element falls within the range of nearby elements, the selected element likely falls on an edge or transition region.

Note that signal processor 140 can test different groupings of one or more nearby elements in a vicinity of the selected element (also comparing them with a set of possible configurations of nearby elements) to determine whether or not the selected element disposed between the tested groupings resides within a transition region. Certain selections of element groupings may provide an indication that the selected element does not reside in a transition region as mentioned above. In such an embodiment, a metric may not be used to upsample. As mentioned above, the signal processor 140 can be configured to presume that the selected element falls within a transition region if the settings of the nearby elements satisfy a test (within appropriate thresholds of confidence) with at least one of a set of possible configurations and the setting of the selected element falls in a range defined by settings of the nearby elements.

As a more specific example, in response to detecting that a magnitude (e.g., setting, value, etc.) of the selected element G1 falls within a range defined by a candidate set of multiple groupings of neighbor elements, the signal processor 140 assumes that the selected element resides near a transition region and thus produces the metric 125 based on respective settings of nearby elements as a basis to define the transition. As mentioned and as discussed in more detail below, the metric can serve as a basis for identifying settings to assign to elements U1, U2, U3, and U4.

Assume in this example that each element in a first set of one or more elements (e.g., element X1) in a vicinity of the selected element is set to a value of approximately 100 (e.g., assume element X1=100) and that each element in a second set of one or more elements (e.g., element Y1, Y2, and Y3) in a vicinity of the selected element is set to a value of approximately 0 (e.g., assume that element Y1=0.1, Y2=0, and Y3=0.3). In such an instance, the signal processor 140 sets the lower limit of the range to 0 and the upper limit of the range to 100. Further assume in this example that the selected element G1 has an assigned value of 37. Since the value of selected element G1 falls between the range limits 0 and 100, the signal processor 140 assumes that the selected element G1 resides on or near a transition region and the selected element can be upsampled via use of a respective metric 125. In such an instance, the respective metric 125 can be beneficially used to upsample the element G1 into the elements U1, U2, U3, and U4 at the second level of quality.

The signal processor 140 produces metric 125 based on settings of nearby elements. The metric 125 defines a boundary. As will be discussed in more detail later in this specification, the location and orientation of the boundary with respect to the selected element depends on magnitudes of the settings of elements in the vicinity of the selected element. In one embodiment, linear interpolation techniques (or any other suitable measurement technique) can be used to identify the location and orientation of the metric 125 defining the respective boundary. Additional details of using linear interpolation will be discussed in more detail later in this specification.

As previously discussed, note again that embodiments herein can be extended to processing of a signal representing a volume. In accordance with such an embodiment, a combination of settings of the selected element, a first set of elements in a vicinity of the selected element, and a second set of elements in vicinity of the selected define a portion of a volumetric image at a first level of quality. In this instance, the metric 125 defines a surface boundary in the portion of the volumetric image at the first level of quality. The signal processor 140 uses the metric 125 (in a similar manner as discussed above) to calculate settings for multiple volumetric image elements in the signal at the second level of quality. The signal processor 140 can produce the metric 125 (e.g., a surface boundary) in response to detecting that a magnitude of the selected element falls within a range, a lower limit of the range defined by settings of a first set of elements in a vicinity of the selected element, an upper limit of the range defined by settings of a second set of elements in a vicinity of the selected element in the volume.

In a similar manner as discussed above for the two-dimensional case, the signal processor 140 can be configured to test different groupings of nearby elements (in the volume) to identify whether the selected element falls within a transition region in the volume.

Regardless of the number of dimensions, note further that the signal processor 140 can repeatedly generate metrics for elements in renditions of a signal at each of multiple higher levels of quality to upsample and reproduce rendition of the signal at yet higher levels of quality. For example, where appropriate, the signal processor 140 can utilize a metric generated for a selected element at level of quality #2 to upsample the selected element into multiple elements at level of quality #3; the signal processor 140 can utilize a metric generated for a selected element at level of quality #3 to upsample the selected element into multiple elements at level of quality #4; and so on.

In one embodiment, the signal processor 140 repeats upsampling at successively higher levels of quality to reconstruct a rendition of the original signal at a highest level of quality. The produced rendition of the signal may be a same resolution and identical or near identical to the original signal.

An example of an encoder system in which the techniques as discussed herein can be used is described in related application United States Patent Application entitled "SIGNAL PROCESSING AND TIERED SIGNAL ENCODING," filed on the same day as the present application, the entire teachings of which are incorporated herein by this reference. In such an embodiment, the signal processor 140 can be configured to test and determine which upsample option (e.g., use of metric/deblending filter or use of alternative upsample options) is suitable for each element at each level of quality.

In a multi-scale inheritance-based encoding loop, the signal is successively downsampled in the hierarchy to the rendition of the signal at the first level of quality as described in. Implementation of the metric 125 ("deblending filter") among the available upsampling operations in the multi-scale encoding loop can reduce an amount of residual data needed to reconstruct, based on a rendition of the signal at a lower level of quality, a rendition of the signal at a higher level of quality in the hierarchy.

One example of a decoder system in which the techniques of upsampling using a metric or alternative upsample options as discussed herein can be used is described in related application United States Patent Application entitled "TIERED SIGNAL DECODING AND SIGNAL RECONSTRUCTION,", filed on the same day as the present application, the entire teachings of which are incorporated herein by this reference. In such an embodiment, the signal processor 140 can be configured to test and determine the appropriate upsample operation (e.g., use of metric/deblending filter or alternative upsample options) that will be used to upsample each element at each level of quality. In yet another embodiment, the decision made at the encoding site can be sent to and replicated by the decoder, trading a slightly higher transmission bandwidth for reduced decoding complexity.

A decoder can be configured to implement the steps of selecting an element in the rendition of signal 115-1, producing (if applicable) a metric 125, and utilizing in a multi-scale decoder loop to reconstruct, based on a rendition of the signal at a lower level of quality, a rendition of the signal at a higher level of quality. Generation and use of a metric in lieu of an alternative upsampling operation can reduce or alter an amount of residual data needed after the upsampling in order to reconstruct the rendition of the signal at the second level of quality.

Figure 2:
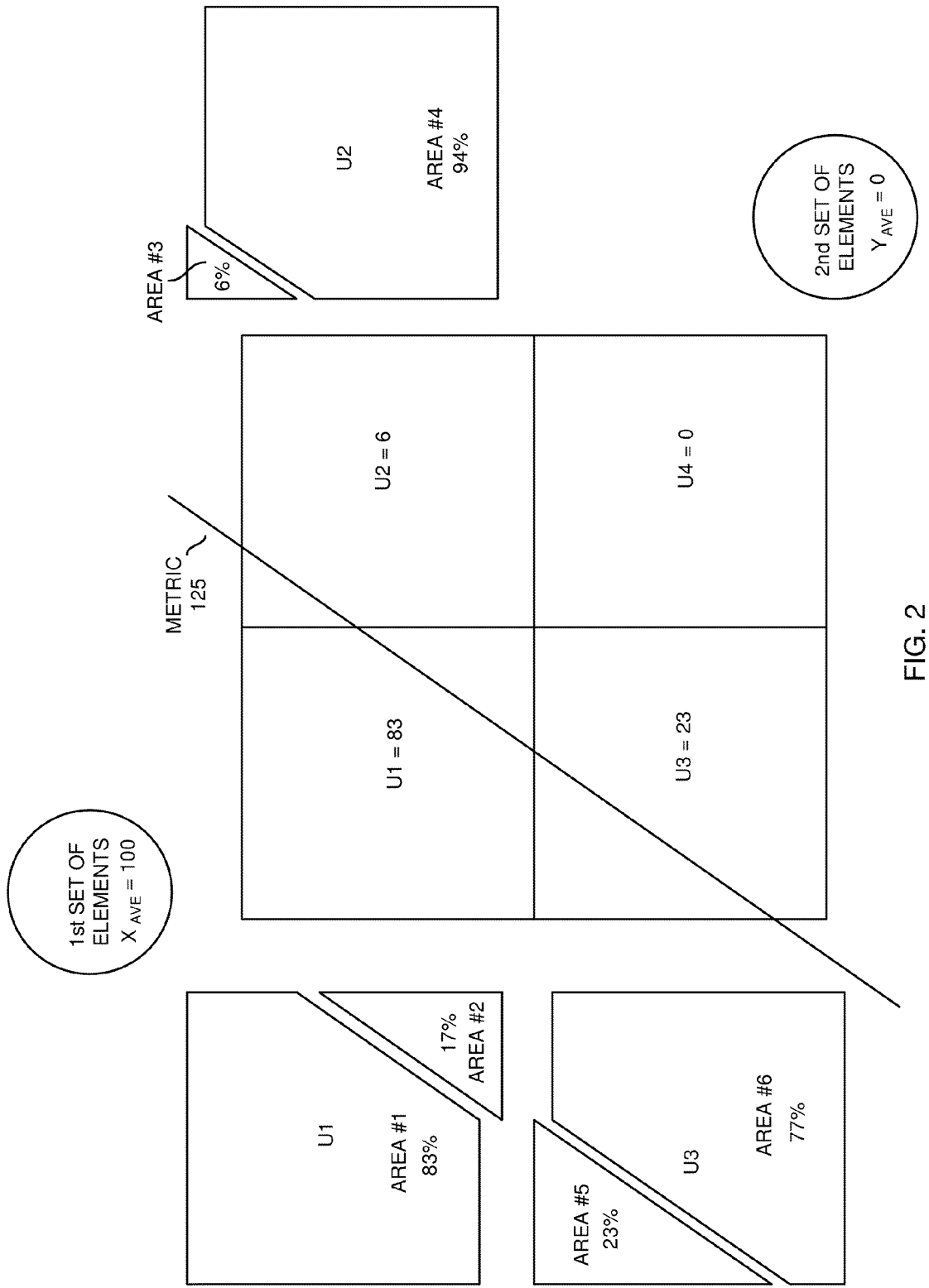
FIG. 2 is an example diagram illustrating use of a metric generated for a selected element at a first level of quality to calculate settings for upsampling of the selected element to multiple elements at a next higher level of quality according to embodiments herein.

FIG. 2 is an example diagram illustrating use of a metric generated for a selected element at a first level of quality to calculate settings for upsampling of the selected element to multiple elements at a next higher level of quality according to embodiments herein.

In accordance with one embodiment as previously discussed, the signal processor 140 uses the metric to upsample the element G1 into elements U1, U2, U3, and U4. Note that upsampling of the element G1 into four elements (e.g., based on a scale factor of 2×2) at a next higher level of quality is shown by way of non-limiting example only and that upsampling can include any suitable scaling up from one level of quality to a next higher level of quality.

Assume in this example that the signal processor 140 set range limits for the first set (e.g., assume element X1=100)

and second set (e.g., assume element Y1=0.1, Y2=0, and Y3=0.3) of nearby elements are 0 and 100, respectively. In such an instance, the lower limit of the range is 0 and the upper limit of the range to 100. Assume in this example that the selected element G1 has an assigned value of 37.

The signal processor 140 generates values for the elements U1, U2, U3, and U4 based on the metric 125. For example, to produce settings for each of U1, U2, U3, and U4 based on the metric 125, the signal processor 140 first identifies which of the elements U1, U2, U3, and U4 are intersected by the metric 125.

In this example, the signal processor 140 identifies that metric 125 intersects elements U1, U2, and U3 (amongst elements U1, U2, U3, and U4). For each of the elements U1, U2, and U3, in response to detecting the intersection, the signal processor 140 utilizes the metric 125 to calculate a respective setting. The signal processor 140 sets the values for each of these elements U1, U2, and U3 between a setting (e.g., 100) assigned to the first set of elements (e.g., X) and a setting (e.g., 0) assigned to the second set of elements (e.g., Y).

In this example, the signal processor 140 identifies that metric 125 does not intersect element U4 (amongst elements U1, U2, U3, and U4). In response to detecting that all of the element U4 resides between the boundary defined by the metric 125 and the first set of elements (e.g., Y elements), the signal processor 140 sets the element U4 to a value substantially equal to 0. This is the setting assigned to the second set of elements.

Note that if the signal processor 140 detected that another particular element resided between the boundary defined by the metric 125 and the first set of elements (e.g., X elements), then the signal processor 140 would set the particular element to a value (e.g., 100) substantially equal to the setting assigned to the first set of elements. Note however that this did not happen in this example case but may happen for other elements under test.

Recall that the signal processor 140 detects that the boundary defined by the metric 125 intersects each of elements U1, U2, and U3 the signal at the second level of quality. In accordance with further embodiments as shown in FIG. 2, for each element, the signal processor calculates i) a first value indicating how much of a respective element resides between the boundary defined by metric 125 and the first set of elements (e.g., X element) and ii) a second value indicating how much of a respective element resides between the boundary defined by the metric 125 and the second set of elements (e.g., Y elements). The signal processor calculates a setting for each respective intersected element based on the range (e.g., 0 to 100) and a proportion or weighting of the first value to the second value.

Recall that the lower limit of the range (e.g., 0 to 100) is defined by settings of the second set of elements and that the upper limit of the range (e.g., 0 to 100) is defined by settings of the first set of elements. In this example, assume that 83% of the area associated with element U1 resides between the boundary defined by metric 125 and the second set of elements Y. Further assume that 17% of the area associated with element U1 resides between the boundary defined by metric 125 and the first set of elements X. Based on these values, the signal processor 140 sets the element U1 to a value of 83. For example, the signal processor 140 utilizes the following equation to produce this value:

$$U(i) = \text{UPPER RANGE LIMIT} - PV1(i) * (\text{UPPER RANGE LIMIT} - \text{LOWER RANGE LIMIT}),$$

where PV1(i)=percentage of upsample element i (e.g., one of elements U1, U2, and U3) falling between the boundary and the lower limit;

or $$U(i) = \text{LOWER RANGE LIMIT} + PV2(i) * (\text{UPPER RANGE LIMIT} - \text{LOWER RANGE LIMIT}),$$

where PV2(i)=percentage of upsample element i falling between the boundary and the upper limit.

Using the equations above, and weighting as discussed above, the signal processor 140 sets the element U2=6. For example, assume that 6% of the area associated with element U2 resides between the boundary defined by metric 125 and the first set of elements X. Further assume that 94% of the area associated with element U2 resides between the boundary defined by metric 125 and the second set of elements Y. Based on these values and the above equation, the signal processor 140 sets the element U2 to a value of 6.

Using the equations above, the signal processor 140 sets the element U3=23. For example, assume that 23% of the area associated with element U3 resides between the boundary defined by metric 125 and the first set of elements X. Further assume that 77% of the area associated with element U3 resides between the boundary defined by metric 125 and the second set of elements Y. Based on these values and the above equation, the signal processor 140 sets the element U3 to a value of 23.

All of the area associated with element U4 resides between the boundary defined by metric 125 and second set of elements. In such an instance, the signal processor assigns element U4 a value substantially equivalent to the settings associated with Y elements (e.g., second set of elements). That is, the signal processor 140 sets U4=0.

As previously mentioned, the rendition of signal can represent a volume of elements. In accordance with such an embodiment, the signal processor 140 executes the same steps as discussed above for the volumetric elements.

For example, the signal processor 140 can be configured to detect that a surface boundary defined by the metric 125 intersects a particular volumetric element of the multiple image elements in the volumetric image at the second level of quality. For the particular volumetric element, the signal processor 140 calculates i) a first value indicating how much of the particular volumetric element resides between the surface boundary and the first set of elements and ii) a second value indicating how much of the particular volumetric element resides between the surface boundary and the second set of elements. The signal processor 140 then calculates a setting for the particular volumetric element within a range based on magnitudes of the first value and the second value.

Figure 3:
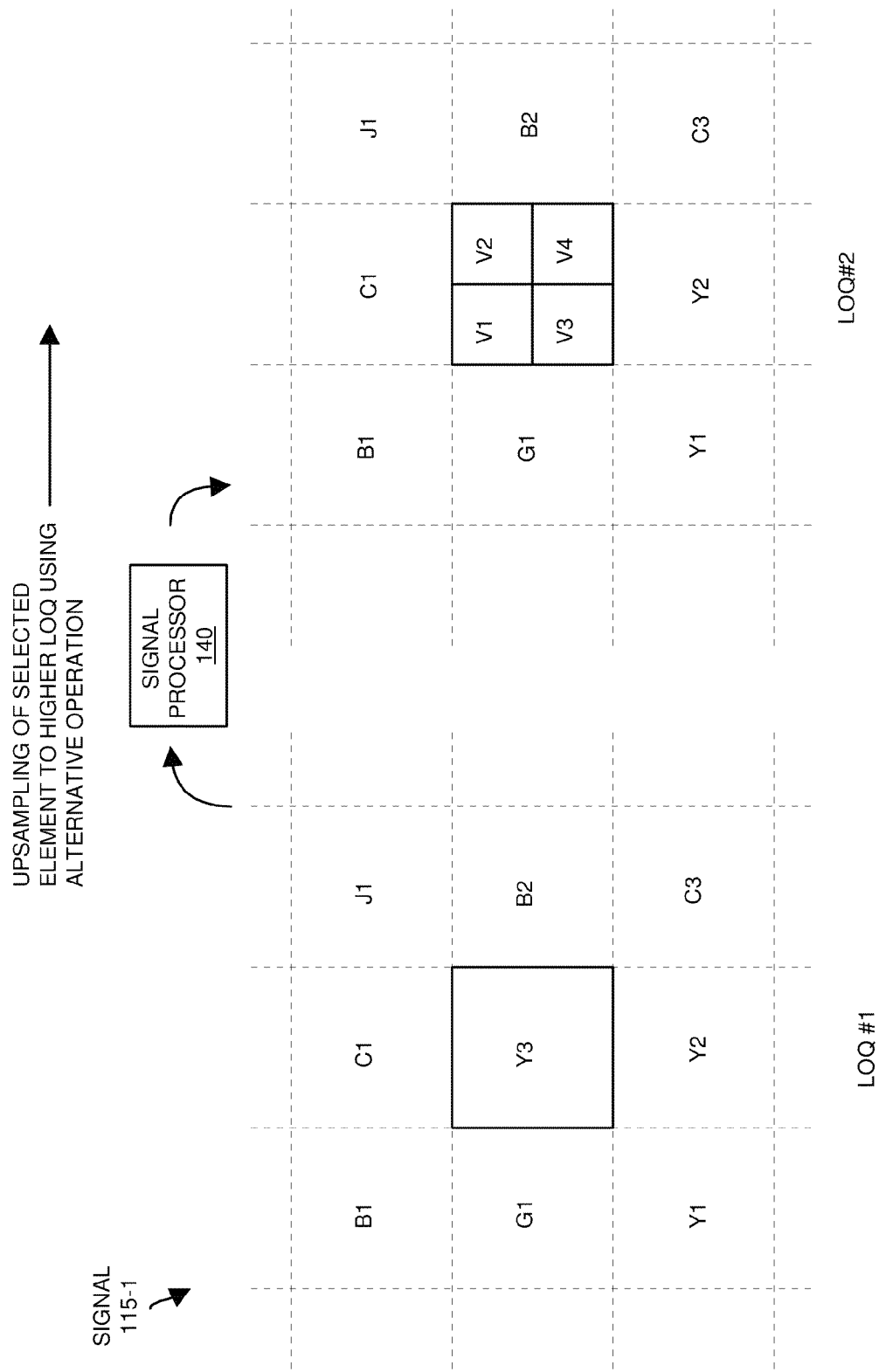
FIG. 3 is an example diagram illustrating upsampling of a selected element into multiple elements using an alternative upsample option according to embodiments herein.

FIG. 3 is an example diagram illustrating upsampling of a selected element into multiple elements using an alternative upsample option according to embodiments herein. Assume in this example, that the signal processor 140 is unable to generate a respective metric to upsample the selected element Y3 to multiple elements at a higher level of quality.

More specifically, assume that the selected element Y3 is not assigned a setting that falls within a range defined by two or more sets of nearby elements in a vicinity of the selected element. The signal processor 140 identifies this condition after testing and exhausting different possible axially opposing sets of nearby element groupings. In response to detecting this condition, the signal processor 140 presumes that the selected element does not fall near a well-defined boundary or transition region and thus uses an alternative upsample option to upsample the element Y3 to multiple elements V1, V2, V3, and V4.

Figure 4:
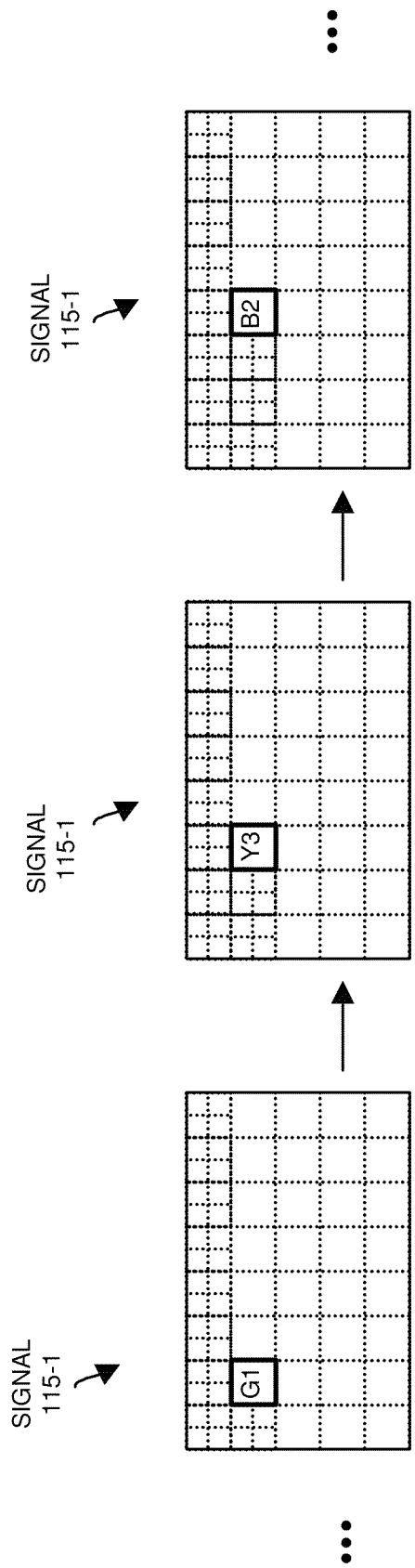
FIG. 4 is an example diagram illustrating an operation of selecting and upsampling each of multiple elements of a signal at a first level of quality into multiple elements of the signal at a second level of quality according to embodiments herein. The operation can be executed either iteratively or in parallel processing.

FIG. 4 is an example diagram illustrating an operation of upsampling each of multiple elements of a signal at a first level of quality into elements of the signal at a second level of quality according to embodiments herein. As shown, the signal processor 140 tests each of multiple elements in the rendition of signal 115-1 at level of quality #1 to identify whether use of a generated metric would be appropriate to perform upsampling for the respective element. The signal processor 140 conditionally produces a respective metric based on settings of elements in a vicinity of the next selected element in the rendition of the signal at the first level of quality.

As an example, the signal processor 140 applies a test to each of multiple respective elements in the rendition of the signal at the first level of quality to determine whether to assign a first type of upsample operation (e.g., one which uses a generated metric) to the respective element or assign an alternative second type of upsample operation (e.g., one which does not utilize a metric) to the respective element for decoding.

The test of each element can include determining whether a setting of a selected respective element falls within a range as discussed above. The signal processor 140 assigns the first type of upsample operation for upsampling the respective elements in which a respective setting of the respective element falls within the range produced for the respective element. The signal processor 140 assigns the second type of upsample operation for upsampling the respective elements in which a respective setting of the respective element falls outside the range produced for the respective element. Accordingly, different elements in a given level of quality of a signal can be assigned different upsample operations.

FIG. 5 is an example diagram illustrating assignment and use of different types of upsample operations to upsample a rendition of a signal to a higher level of quality according to embodiments herein. Note that elements G1, Y3, and B2 have been labeled in the map 510 to indicate the how the elements in the map 510 correspond to the elements in rendition of signal 115-1.

As previously discussed, the signal processor 140 can be configured to test whether it is beneficial to upsample based on a respective metric 125 for the selected element or use an alternative upsample operation (e.g., use other upsampling and image processing approaches such as a bicubic filter and/or an unsharp masking filter). Based on results of the test, the elements in map 510 indicate whether the corresponding elements in the rendition of signal 115-1 at level of quality #1 will be upsampled from level of quality #1 to level of quality #2 using a generated metric (e.g., labeled with M) or an alternative method (e.g., labeled with an O).

By way of a non limiting example, the regions in map 510 marked with a letter M can indicate where transitions or edges occur in a respective image. The attributes indicate coarse attributes (e.g., an outline) of a respective image at a lower level of quality.

Figure 6:
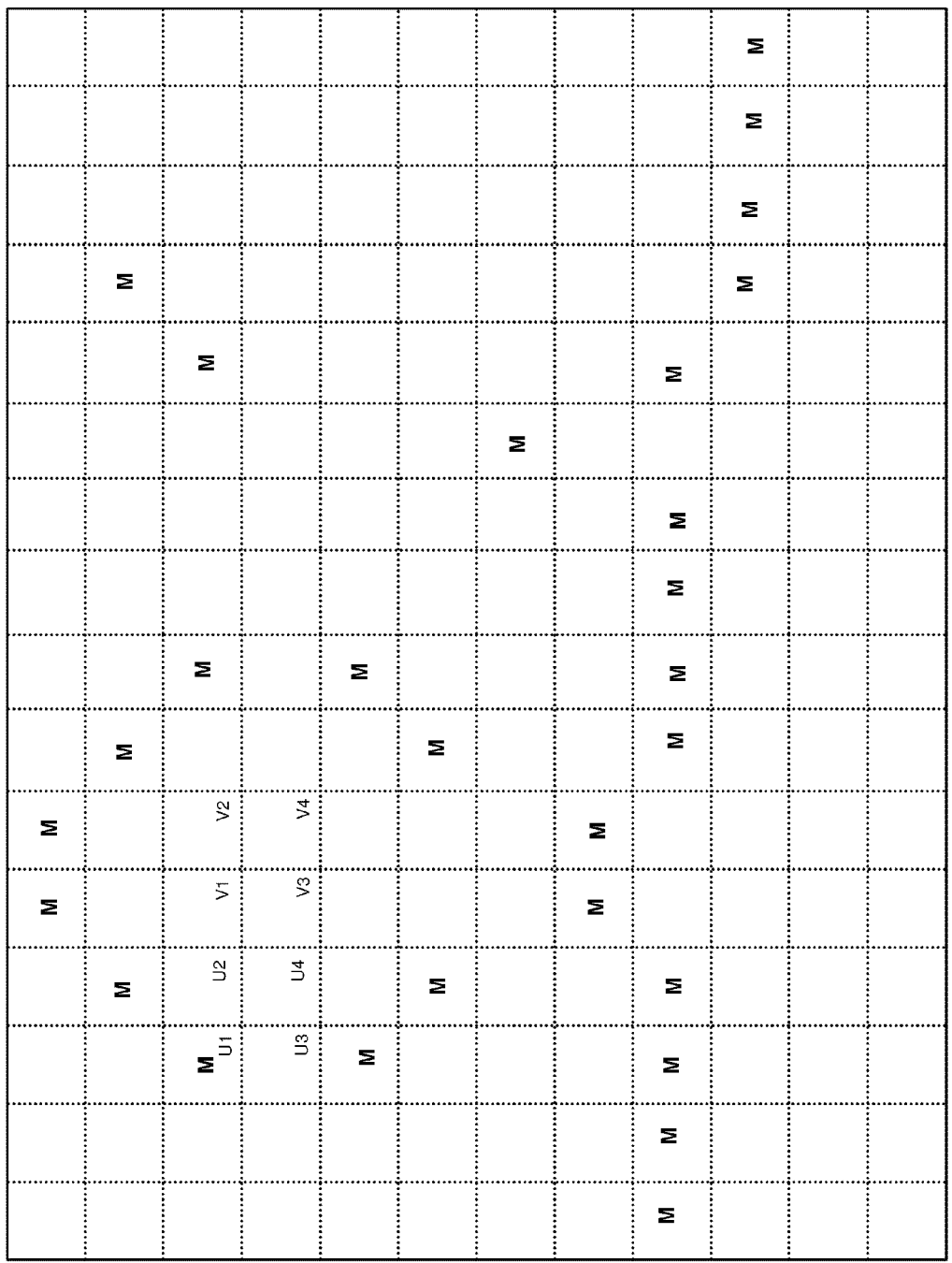
FIG. 6 is an example diagram illustrating assignment and use of different types of upsample operations to upsample a rendition of a signal to a higher level of quality according to embodiments herein.

FIG. 6 is an example diagram illustrating assignment and use of different types of upsample operations to upsample a rendition of a signal to a higher level of quality according to embodiments herein. Note that elements U1, U2, U3, U4, V1, V2, V3, and V4 have been labeled in the map 510 to indicate how the elements in the map 610 correspond to elements in a rendition of the signal at the second level of quality.

As previously discussed, the signal processor 140 can be configured to test whether it is appropriate to upsample based on a respective metric for the selected element or use an alternative upsample operation (e.g., use other upsampling and image processing approaches such as a bicubic filter and/or an unsharp masking filter). Based on results of the test, the elements in map 610 indicate whether the corresponding element will be upsampled from level of quality #2 to level of quality #3 using a generated metric (e.g., labeled with M) or an alternative method (e.g., not labeled).

By way of a non-limiting example, the regions in map 610 marked with a letter M can indicate where transitions occur in a respective image. The transitions indicate coarse attributes (e.g., an outline) of a respective image at a lower level of quality. In this example, the rendition of signal 115-1 represents a more detailed image including at least one vertical object. Certain transitions (labeled M) have been detected in new regions of the image. The new transitions can indicate presence of additional objects that are now detectable in the higher resolution image.

Edge Reconstruction Filter (e.g., Deblending Upsample Filter)

Figure 7:
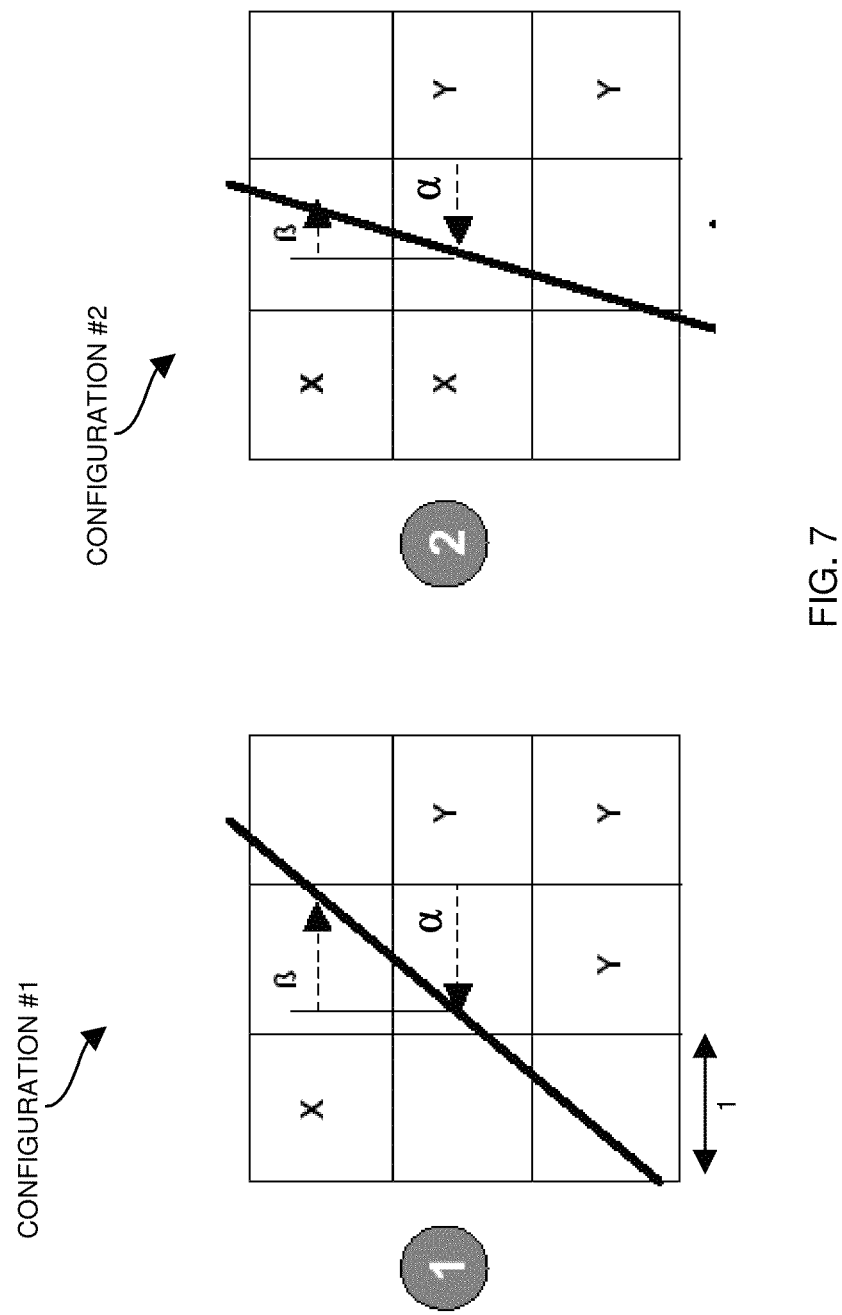
FIG. 7 is an example diagram illustrating different configurations for generating metrics according to embodiments herein.

FIG. 7 is an example diagram illustrating two different configurations for creating metrics according to embodiments herein. Note that these two configurations are shown by way of a non-limiting example and that any number of configurations can be used to as a model for upsampling a particular element from one level of quality to the next.

As discussed above, when a decoder upsamples back to higher levels of quality, it is often desirable to leverage "intelligent" filters to reconstruct an original signal in order to reduce an entropy of residual data that the encoder must create in order to upsample the signal from one level of quality to another.

Consider that a large portion of images in video data (e.g., moving pictures with frames) include either very sharp borders/transitions or very gradual/blurred transitions. In order to avoid a jagged or blurred reconstruction when upsampling a straight edge or sharp borders/transitions in a lower resolution signal, embodiments herein can include use of at least two types of image processing and upsample operations, including unsharp masking (which does not generate a metric and does not upsample) and a deblending filter (which does generate a metric to upsample).

Unsharp Masking Filter

Unsharp masking is a popular filtering technique that enhances transitions. It does not have the ability to recreate a sharp transition after upsampling. However, when applied, it makes transitions steeper. This may introduce artifacts into the rendition of the signal, especially if the transition was not sharp to begin with. Thus, the Unsharp Masking filter is typically used only above a threshold. For example, for very gradual transitions, below a threshold, the filter is not used.

According to one embodiment herein, the threshold of whether to use the Unsharp Masking filter can be decided by the encoder for each level of quality. The decision to use the filter can be overridden for selected controlled image zones in order to globally minimize an amount of residual data.

Deblending Filter

The so-called deblending filter as discussed herein is a custom filter to restore (e.g., upsample) edges at different level of quality in a signal. The deblending filter can include use of a generated metric 125 for each of one or more elements being upsampled as previously discussed.

In one embodiment, the deblending filter is used before upsampling, and is used on relatively small portions (such as a 3 by 3 region of elements, in the non-limiting case of a two-dimensional signal) of the lower level image instance. However, note that this embodiment is shown by way of non-limiting example only and that the concepts as discussed herein can be applied to any sized portion (e.g., 4×4, 5×5, etc.) of a signal.

Also, as previously discussed, one embodiment includes upsampling from level of quality n−1 to level of quality n. Use of the metric is based on the assumption that there are generally only two different values of elements in the selected portion and that the transition/border between them can be approximated with a suitable boundary such as a straight line, curved line, planar surface, etc.

When the algorithm and respective metric cannot be applied to a particular element to achieve upsampling, embodiments herein include using for the higher resolution rendition of the signal element the multiple elements obtained by upsampling with other default upsampling operations/filters (e.g., a bicubic filter operation plus an unsharp masking filter).

Note that the algorithm (and generation of a metric as discussed herein) to upsample from one level of quality to the next is typically used on a fairly low percentage (e.g., 10%) of elements in a signal being upsampled. As mentioned, signal elements in lower levels of quality of a signal typically contain "coarse" image information. The elements in which a metric can be used to upsample to a next level of quality are typically very important elements since artifacts on sharp borders in a signal tend to be very undesirable. They are also regions in which, when reconstructing a higher level of quality, a large amount of residual data would be needed in order to correct the upsampled rendition of the lower level of quality, if upsampled according to conventional methods and filters. As mentioned, upsampling using metric 125 reduces an amount of residual data as the operation intelligently upsamples a rendition of signal from one level of quality to the next.

One embodiment herein recognizes that—based on the angle of the ideal boundary that represents an edge—there are at least two main model cases in which the metric can be advantageously used to determine whether the region under test includes a transition or edge. The region under test can be rotated or flipped to produce a total of eight different model cases (two for each orientation) for checking whether a selected element and corresponding neighboring elements define a transition or edge in which the metric can be used to upsample from one level of quality of the next. Testing different combinations of elements in a vicinity of a selected element under test ensures that a transition can be identified if one happens to exist.

As shown in FIG. 7, if the two possible settings for elements marked as X and Y in the portions under test are identified to be within a given range/threshold (e.g., there are a group elements X that are set to nearly the same first value and there are a group of elements Y that are set to nearly the same second value) for the given level of quality, embodiments herein include generating and utilizing the metric 125 as discussed above to upsample element. Otherwise, the alternative upsample operation is used. These two cases are described below.

Figure 8:
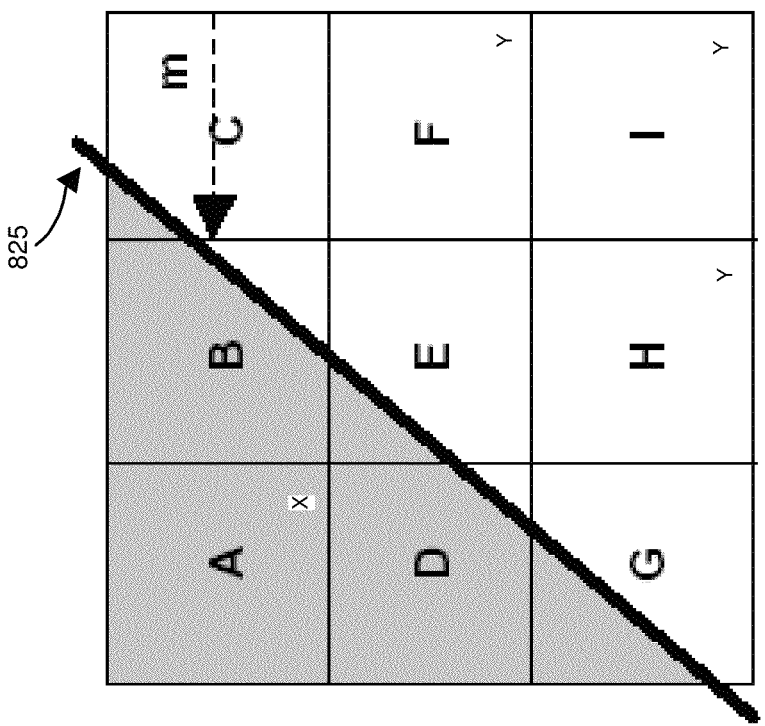
FIG. 8 is an example diagram illustrating generating a metric for a first configuration according to embodiments herein.

FIG. 8 is an example diagram illustrating generating a metric for a first configuration according to embodiments herein (the specific condition to check being that one of the two range extremes, e.g., Y, appears at least three times on one of the corners, e.g., the bottom-right corner, and the other extreme appears at least once on the opposite corner).

As mentioned, the values for elements marked with an X and Y are tested to ensure that they fall within a threshold range. The other elements will likely contain values that are a blend of X and Y since they likely come from a downsample filtering of a sharp border that separates an area full of elements with value X from an area full of elements with value Y. As discussed above, according to one embodiment, the specific value of each element can depend on how much of their area is on the left or on the right of the ideal straight line that we want to identify. In particular, the way in which we can identify the straight line is by calculating two parameters: α and β.

In this configuration, we can assume that $\alpha \geq \frac{1}{2}$ and that $0 \leq \beta \leq 1$ (having normalized the dimensions of each element to 1×1 units). If this is not the case, we can just flip or rotate the 3×3 block of elements under test.

As we can see from the elements under test in FIG. 8, the angle of the line that we want to reconstruct influences the values that we will find in (B+C), in (D+E) and in (G+H). In any case, their values will be somewhere in between 2X and 2Y, but depending on where the line is and on its slope, they can be closer to 2X or closer to 2Y. Assuming that the values of the elements in the 3×3 block come from downsampling with some kind of linear filtering, we can leverage an operation known as "Linear interpolation" (or "LERP"). The operation is very efficient and works as follows:

$$\text{LERP}(X, Y, m) = X + m \cdot (Y - X) = (1-m) \cdot X + m \cdot Y \quad m \in (0, 1)$$

In practice, the operation could be used to obtain the value of (B+C) as if we were in an upsampled level (much higher resolution): we would linearly interpolate the value of 2X (both elements in grey, if we assume that X is the shade of grey depicted in the image above) with the value of 2Y (both elements white), using the height of the trapezoid as parameter m. In the case of (B+C), since pels have a side of 1, it is easy to see that m is equal to $(1+\alpha-\beta)$.

As a consequence, we have two linear equations that we can solve for the two variables α and β (please note that element values A, B, C, D, E, F, G, H, I and range extremes X, Y are all known quantities):

$$B + C = \text{LERP}\left(2X, 2Y, \frac{1+\alpha-\beta}{2}\right)$$

$$D + E = \text{LERP}\left(2X, 2Y, \frac{\alpha}{2}\right)$$

$$G + H = \text{LERP}\left(2X, 2Y, \frac{\alpha+\beta}{2}\right)$$

Thus, embodiments herein include calculating/estimating the values of α and β, by solving the equations above. Via the values, the ideal straight line which we will replicate in the upsampled level, can be used to avoid generation of unpleasant blurred staircase effects when upsampling form one level of quality to the next. To improve the estimate and especially when β is large, embodiments herein can include an additional equation for (D+G) if desired.

Figure 9:
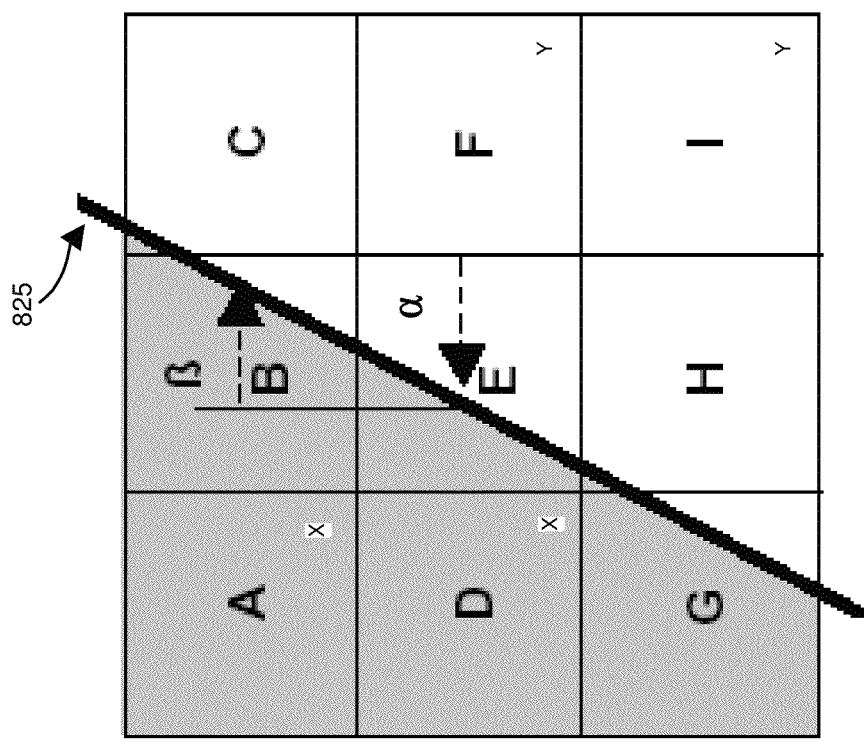
FIG. 9 is an example diagram illustrating generating a metric for a second configuration according to embodiments herein.

FIG. 9 is an example diagram illustrating generating a metric for a second configuration according to embodiments herein (the specific condition to check being that one of the two range extremes, e.g., Y, appears at least twice on one side including one corner, e.g., the right-hand side including the bottom-right corner, and the other extreme appears at least twice on the opposite side including the opposite corner).

In accordance with this configuration, it is assumed that $\alpha \geq \frac{1}{2}$ and that $0 \leq \beta \leq 1$ (again, if that is not the case, the 3×3 block can be flipped or rotated). Again we have three equations that can help us estimate the values of α and β, hence reconstructing the straight line:

$$B + C = LERP\left(2X, 2Y, \frac{1 + \alpha - \beta}{2}\right)$$

$$E = LERP(X, Y, \alpha)$$

$$G + H = LERP\left(2X, 2Y, \frac{\alpha + \beta}{2}\right)$$

Again, also here we have three equations with two unknowns, which can help us to further refine the estimates of α and β.

As previously discussed, the deblending filter upsample algorithm can be expanded for use on signals having more than 2 dimensions (e.g., 3D images, holographic images, etc.).

Figure 10:
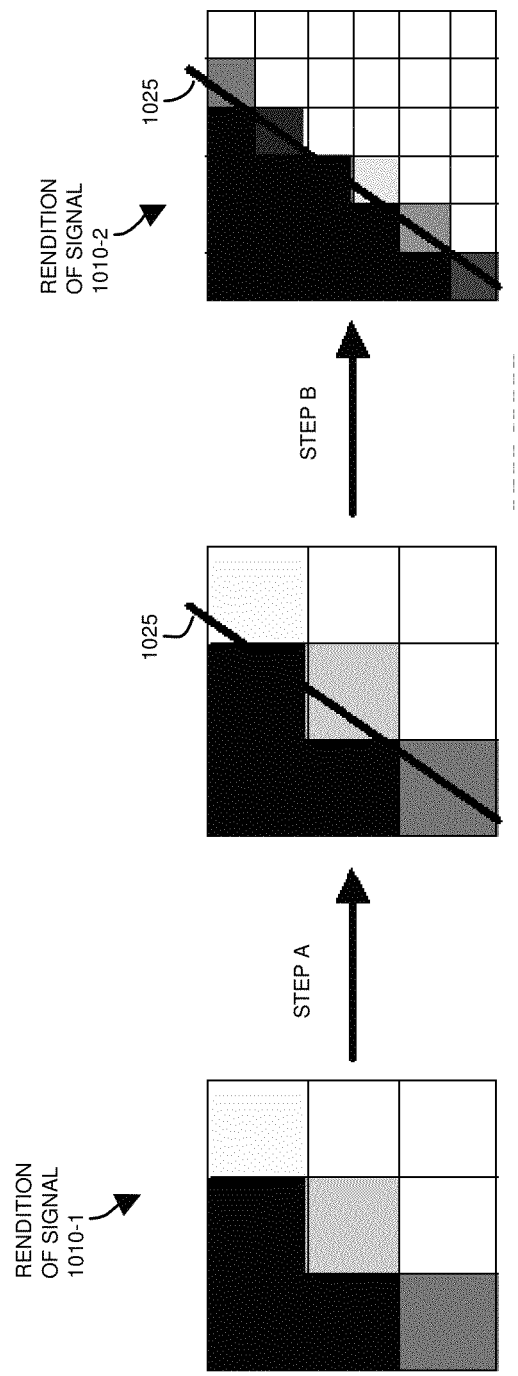
FIG. 10 is an example diagram illustrating results of using a generated metric to upsample elements of a signal according to embodiments herein.

FIG. 10 is an example diagram illustrating results of utilizing a metric 1025 to upsample elements of a signal to a higher level of quality according to embodiments herein. As shown, the signal processor 140 utilizes the algorithm in step A to produce metric 1025 in a manner as previously discussed. Based on metric 1025, the signal processor 140 upsamples the rendition of signal 1010-1 into rendition of signal 1010-2. notice how use of the metric 1025 preserves an integrity of the boundary defined metric 1025 during the upsampling.

Figure 11:
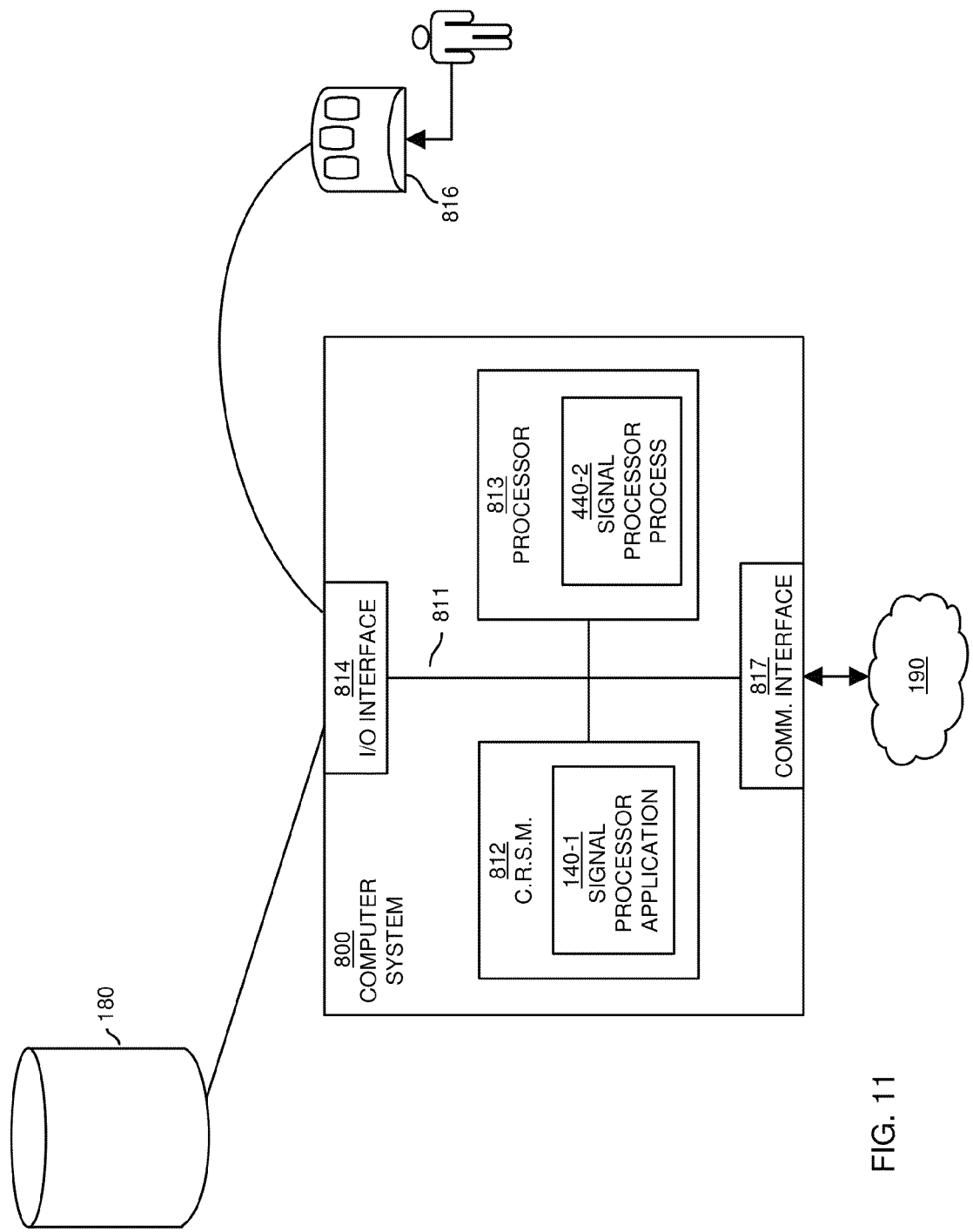
FIG. 11 is a diagram illustrating an example computer architecture for executing computer code, firmware, software, applications, logic, etc., according to embodiments herein.

FIG. 11 is an example block diagram of a computer system 800 that provides computer processing according to embodiments herein.

Computer system 800 can be or include a computerized device such as a personal computer, processing circuitry, television, playback device, encoding device, workstation, portable computing device, console, network terminal, processing device, network device, operating as a switch, router, server, client, etc.

Note that the following discussion provides a basic embodiment indicating how to carry out functionality associated with signal processor 140 as previously discussed. However, it should be noted that the actual configuration for carrying out the operations as described herein can vary depending on a respective application.

As shown, computer system 800 of the present example includes an interconnect 811 that couples computer readable storage media 812 such as a non-transitory type of media, computer readable, hardware storage medium, etc., in which digital information can be stored and retrieved. Computer system 800 can further include a processor 813, I/O interface 814, and a communications interface 817.

I/O interface 814 provides connectivity to repository 180, and if present, display screen, peripheral devices 816 such as a keyboard, a computer mouse, etc.

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with signal processor 140. The instructions are executed by a respective resource such as signal processor 140 to perform any of the operations as discussed herein.

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180.

As shown, computer readable storage media 812 can be encoded with signal processor application 140-1 executed by processor 813 as signal processor process 140-2.

Note that the computer system 800 or encoder 140 also can be embodied to include a computer readable storage medium 812 (e.g., a hardware storage media, non-transitory storage media, etc.) for storing data and/or logic instructions.

Computer system 800 can include a processor 813 to execute such instructions and carry out operations as discussed herein. Accordingly, when executed, the code associated with signal processor application 140-1 can support processing functionality as discussed herein. As mentioned, signal processor 140 can be configured to support encoding and/or decoding.

During operation of one embodiment, processor 813 accesses computer readable storage media 812 via the use of interconnect 811 in order to launch, run, execute, interpret or otherwise perform the instructions of signal processor application 140-1 stored in computer readable storage medium 812. Execution of the signal processor application 140-1 produces processing functionality in processor 813. In other words, the encoder process 140-2 associated with processor 813 represents one or more aspects of executing signal processor application 140-1 within or upon the processor 813 in the computer system 800.

Those skilled in the art will understand that the computer system 800 can include other processes and/or software and hardware components, such as an operating system that controls allocation and use of hardware processing resources to execute signal processor application 140-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Figure 12:
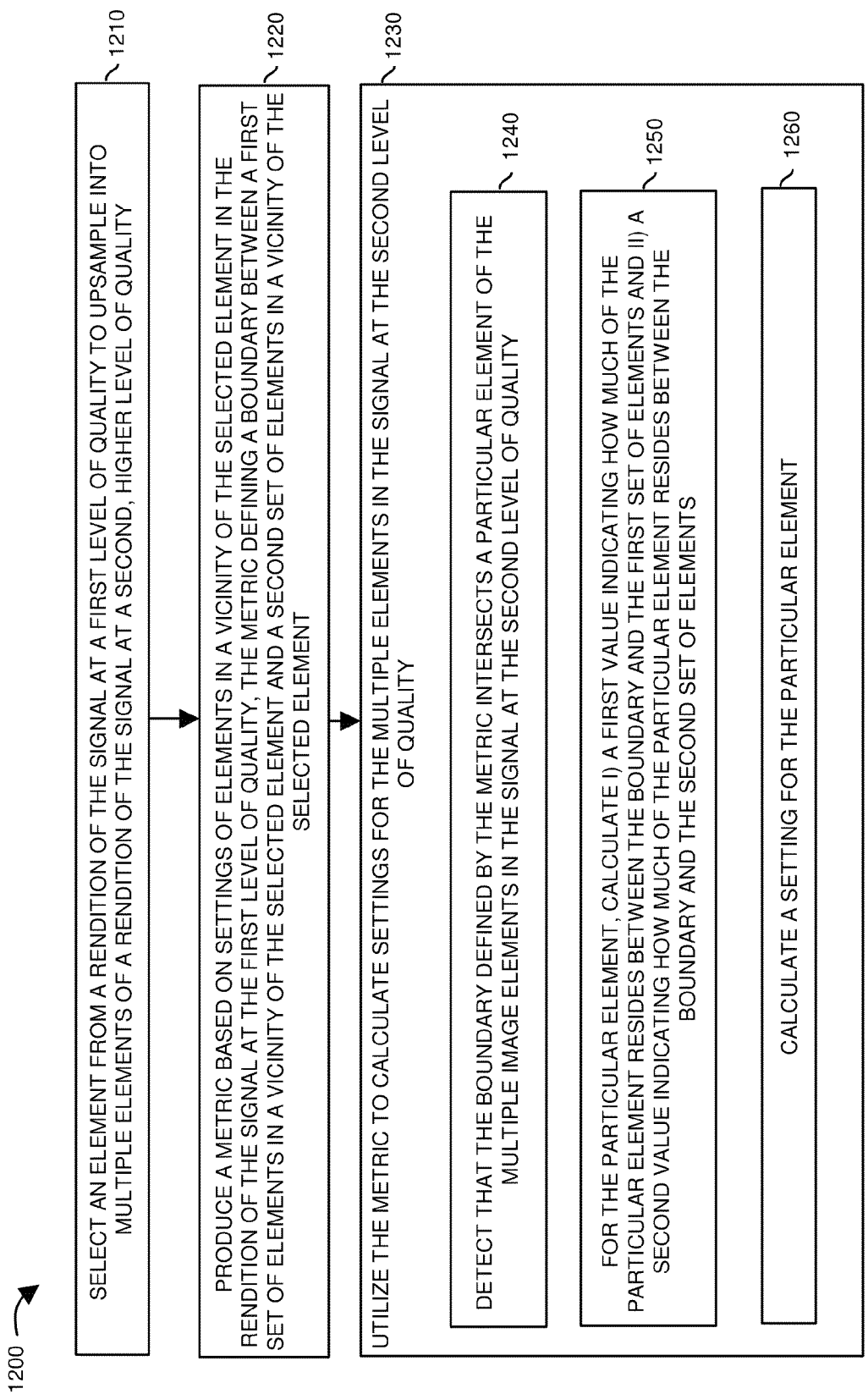
FIG. 12 is an example flowchart illustrating a method of generating and utilizing a metric upsample according to embodiments herein.

FIG. 12 is an example flowchart 1200 illustrating a method of generating and utilizing a metric upsample according to embodiments herein.

In step 1210, the signal processor 140 selects an element from a rendition of the signal 115-1 at a first level of quality to upsample into multiple elements of a rendition of the signal 115-1 at a second, higher level of quality.

In step 1220, the signal processor 140 produces a metric 125 based on settings of elements in a vicinity of the selected element in the rendition of the signal at the first level of quality. The metric 125 defines a boundary between a first set of elements in a vicinity of the selected element and a second set of elements in a vicinity of the selected element.

In step 1230, the signal processor 140 utilizes the metric 125 to calculate settings for the multiple elements in the signal at the second level of quality.

In sub-step 1240, the signal processor 140 detects that the boundary defined by the metric intersects a particular element of the multiple image elements in the signal at the second level of quality.

In sub-step 1250, for the particular element, the signal processor 140 calculates i) a first value indicating how much of the particular element resides between the boundary and the first set of elements and ii) a second value indicating how much of the particular element resides between the boundary and the second set of elements.

In sub-step 1260, the signal processor 140 calculates a setting for the particular element based on the first value and the second value.

Note again that techniques herein are well suited for use in processing and reconstructing signals. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of reconstructing a signal at a higher level of quality in a hierarchy, the method comprising:
    selecting an element from a rendition of the signal at a first level of quality to upsample into multiple elements of a rendition of the signal at a second level of quality, the second level of quality being higher than the first level of quality;
    producing a metric based on settings of elements in a vicinity of the selected element in the rendition of the signal at the first level of quality, the metric defining a boundary between a first set of elements in a vicinity of the selected element and a second set of elements in a vicinity of the selected element;
    Dividing the multiple elements of the rendition of the signal at the second level of quality into subdivisions using the metric; and
    Utilizing areas of the subdivisions of the multiple elements as defined by the metric to calculate settings for the multiple elements in the signal at the second level of quality.

2. the method as in claim 1 further comprising:
    Producing the metric in response to detecting that a setting of the selected element falls within a range, a lower limit of the range defined by settings of the first set of elements, an upper limit of the range defined by settings of the second set of elements.

3. The method as in claim 1, wherein utilizing the metric to calculate settings for the multiple elements in the signal at the second level of quality comprises:
    identifying a first element in the multiple elements in which the boundary defined by the metric intersects the first element;
    for the first element:
        utilizing the metric to calculate a setting for the first element, the setting being a value between a setting assigned to the first set of elements and a setting assigned to the second set of elements;
        identifying a second element of the multiple elements in which the boundary defined by the metric does not intersect the second element; and for the second element:
        in response to detecting that all of the second element resides between the boundary defined by the metric and the first set of elements, setting the second element to a value substantially equal to the setting assigned to the first set of elements; and
        in response to detecting that all of the second element resides between the boundary defined by the metric and the second set of elements, setting the second respective element to a value substantially equal to the setting assigned to the second set of elements.

4. The method as in claim 1, wherein a combination of settings of the selected element, the first set of elements, and the second set of elements define a portion of an image at the first level of quality; and
    wherein the boundary is substantially a linear function overlaid on the portion of the image at the first level of quality, the line used to calculate the settings for multiple image elements in the signal at the second level of quality.

5. The method as in claim 4 further comprising:
    producing the metric in response to detecting that a setting of the selected element falls within a range, a lower limit of the range defined by settings of the first set of elements, an upper limit of the range defined by settings of the second set of elements.

6. The method as in claim 1, wherein utilizing the metric comprises:
    detecting that the boundary defined by the metric intersects a particular element of the multiple image elements in the signal at the second level of quality;
    for the particular element, calculating i) a first value indicating how much of the particular element resides between the boundary and the first set of elements and ii) a second value indicating how much of the particular element resides between the boundary and the second set of elements; and calculating a setting for the particular element within a range based on the first value and the second value, a lower limit of the range defined by settings of the first set of elements, an upper limit of the range defined by settings of the second set of elements.

7. The method as in claim 1, wherein a combination of settings of the selected element, the first set of elements, and the second set of elements define a portion of a volumetric image at the first level of quality; and wherein the metric defines a surface boundary in the portion of the volumetric image at the first level of quality, the metric used to calculate settings for multiple volumetric image elements in the signal at the second level of quality.

8. The method as in claim 7 further comprising:
producing the metric in response to detecting that a setting of the selected element falls within a range, a lower limit of the range defined by settings of the first set of elements, an upper limit of the range defined by settings of the second set of elements.

9. The method as in claim 8, wherein utilizing the metric comprises:
detecting that the surface boundary defined by the metric intersects a particular volumetric element of the multiple image elements in the volumetric image at the second level of quality;
for the particular volumetric element, calculating i) a first value indicating how much of the particular volumetric element resides between the surface boundary and the first set of elements and ii) a second value indicating how much of the particular volumetric element resides between the surface boundary and the second set of elements; and
calculating a setting for the particular volumetric element within a range based on settings of the first amount and the second amount.

10. The method as in claim 1 further comprising:
for each of multiple elements in the rendition of the signal at the first level of quality, repeating steps of:
selecting a next element from the rendition of the signal at the first level of quality to upsample;
conditionally producing a respective metric based on settings of elements in a vicinity of the next selected element in the rendition of the signal at the first level of quality, the respective metric indicative of a boundary between a first set of elements in a vicinity of the next selected element and a second set of elements in a vicinity of the next selected element.

11. The method as in claim 1 further comprising:
analyzing settings of the elements in a vicinity of the selected element to select the first set of elements and the second set of elements;
generating a first value based on settings of at least one element in the first set of elements in the vicinity of the selected element;
generating a second value based on settings of at least two elements in the second set of elements in the vicinity of the selected element;
producing a range in which the first value defines an upper limit of the range and the second value defines a lower limit of the range; and
utilizing the metric and range to produce the settings for the multiple image elements in the signal at the second level of quality.

12. The method as in claim 11, wherein producing the metric occurs in response to detecting that a setting of the selected element falls within the range.

13. The method as in claim 1 further comprising:
iteratively implementing the steps of selecting, producing, and utilizing in a multi-scale encoding loop in which the signal is successively downsampled in the hierarchy to the rendition of the signal at the first level of quality, iterative implementation of the steps in the multi-scale encoding loop used to test upsampling operation options and reduce an amount of residual data needed to upsample a rendition of the signal at a lower level of quality to a rendition of the signal at a higher level of quality in the hierarchy.

14. The method as in claim 1 further comprising:
implementing the steps of selecting, producing, and utilizing in a multi-scale decoder loop in which a rendition of the signal at a lower level of quality is upsampled into a rendition of the signal at a higher level of quality, implementation of the steps in lieu of an alternative upsampling operation, so as to reduce or alter an amount of residual data needed after the upsampling in order to reconstruct the rendition of the signal at the second level of quality.

15. The method as in claim 1, wherein steps of selecting, producing, and utilizing is implemented as a first type of upsample operation, the method further comprising:
applying a test to each of multiple respective elements in the rendition of the signal at the first level of quality to determine whether to assign the first type of upsample operation to the respective element or assign a second type of upsample operation to the respective element for decoding, the test including determining whether a setting of a selected respective element falls within a range defined by settings of a respective first set of elements in a vicinity of the selected respective element and settings of a respective second set of elements in a vicinity of the selected respective element, wherein the respective selected element is disposed in between the respective first set of elements and the respective second set of elements; and
assigning the first type of upsample operation for upsampling the respective elements in which a respective setting of the respective element falls within the range produced for the respective element; and
assigning the second type of upsample operation for upsampling the respective elements in which a respective setting of the respective element falls outside the range produced for the respective element.

16. The method as in claim 1, wherein a location and orientation of the boundary with respect to the selected element depends on the settings of elements in the vicinity of the selected element.

17. The method as in claim 1, wherein dividing the multiple elements into subdivisions includes:
selecting a first element of the multiple elements at the second level of quality to calculate a setting for the first element, the boundary passing through the first element; and
utilizing the boundary to divide the first element into a first area and a second area, the first area residing on a first side of the boundary on which the first set of elements reside, the second area residing on a second side of the boundary on which the second set of elements reside.

18. The method as in claim 17 further comprising:
deriving a first value from settings of the first set of elements in the vicinity of the selected element at the first level of quality; and deriving a second value from the settings of the second set of elements in the vicinity of the selected element at the first level of quality.

19. The method as in claim 18, wherein utilizing the subdivisions of the multiple elements to calculate settings for the multiple elements includes:
calculating a setting for the first element based on the first value, the second value, the first area, and the second area.

20. The method as in claim 19, wherein calculating the setting for the first element comprises:
utilizing the first area to determine a first percentage value, the first percentage value indicating a portion of the first element that resides on the first side of the boundary on which the first set of elements reside;
utilizing the second area to determine a second percentage value, the second percentage value indicating a portion of the first element that resides on the second side of the boundary on which the second set of elements reside;
multiplying the first percentage value by the first derived value to produce a first amount;
multiplying the second percentage value by the second derived value to produce a second amount; and
assigning the setting of the first element to be a sum of the first amount and the second amount.

21. The method as in claim 20 further comprising:
selecting a second element of the multiple elements at the second level of quality to calculate a setting for the second element; and
in response to detecting that the boundary does not pass through the second element, assigning the setting for the second element to be the second derived value.

22. Method as in claim 1 further comprising:
applying residual data to the settings calculated for the multiple elements, the residual data indicating how to modify each of the settings calculated for the multiple elements, application of the residual data modifying the settings of the multiple elements at the second level of quality.

23. Computer-readable storage hardware having instructions stored thereon, the instructions, when carried out by a processing device, causing the processing device to perform operations of:
selecting an element from a rendition of the signal at a first level of quality to upsample into multiple elements of a rendition of the signal at a second level of quality, the second level of quality being higher than the first level of quality;
producing a metric based on settings of elements in a vicinity of the selected element in the rendition of the signal at the first level of quality, the metric defining a boundary between a first set of elements in a vicinity of the selected element and a second set of elements in a vicinity of the selected element;
dividing the multiple elements into subdivisions using the metric; and
utilizing areas of the subdivisions of the multiple elements as defined by the metric to calculate settings for the multiple elements in the signal at the second level of quality.

24. A computer system comprising:
a processor;
a memory unit that stores instructions associated with an application executed by the processor; and
an interconnect coupling the processor and the memory unit, enabling the computer system to execute the application and perform operations of:
selecting an element from a rendition of the signal at a first level of quality to upsample into multiple elements of a rendition of the signal at a second level of quality, the second level of quality being higher than the first level of quality;
producing a metric based on settings of elements in a vicinity of the selected element in the rendition of the signal at the first level of quality, the metric defining a boundary between a first set of elements in a vicinity of the selected element and a second set of elements in a vicinity of the selected element;
dividing the multiple elements into subdivisions using the metric; and
utilizing areas of the subdivisions of the multiple elements as defined by the metric to calculate settings for the multiple elements in the signal at the second level of quality.

* * * * *